Oct. 21, 1958  W. M. BROWN  2,857,174
FIFTH-WHEEL ASSEMBLY
Filed June 25, 1957  3 Sheets-Sheet 1
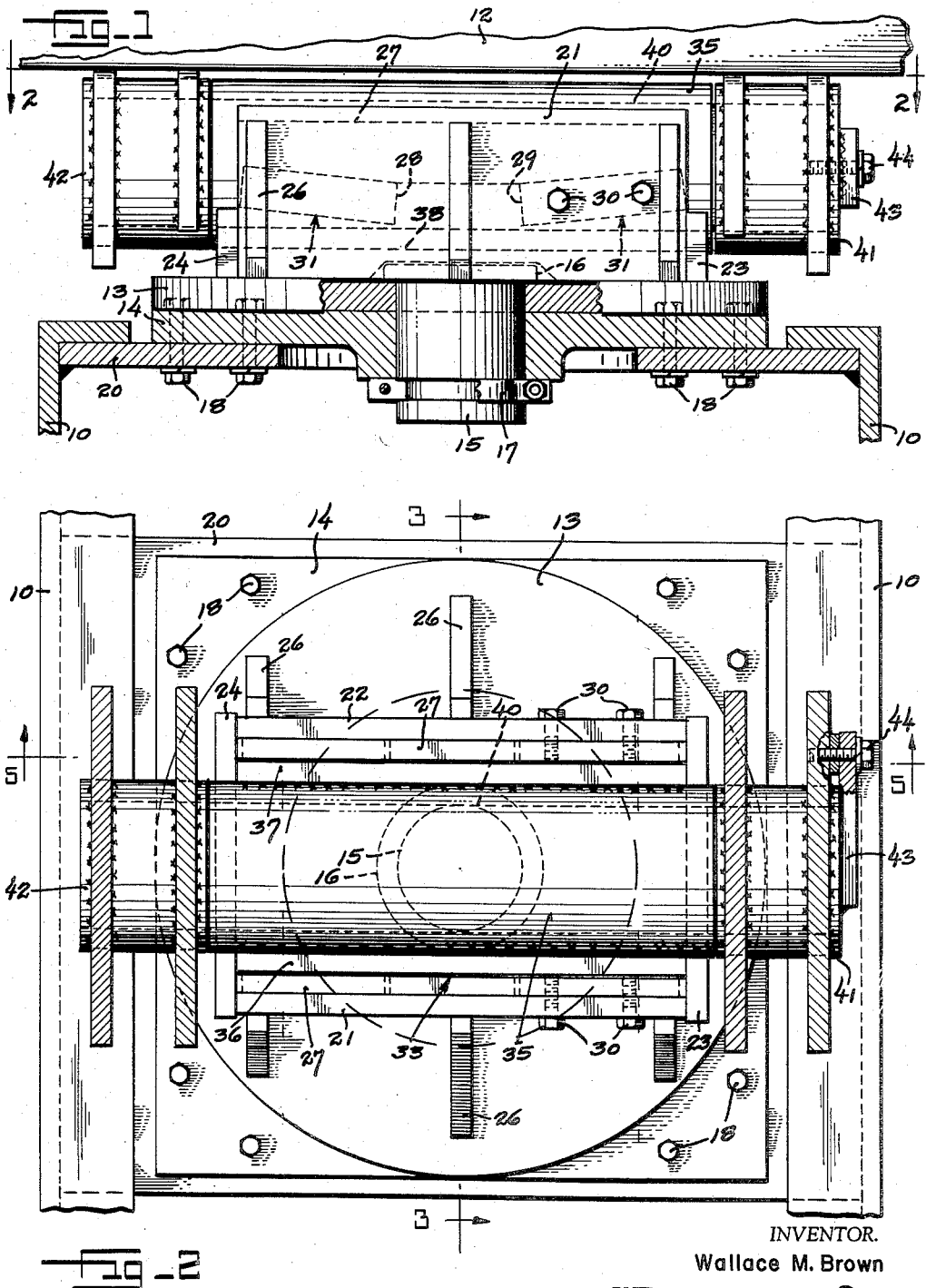
INVENTOR.
Wallace M. Brown
BY
Barnes & Seed
Attorneys Oct. 21, 1958  W. M. BROWN  2,857,174
FIFTH-WHEEL ASSEMBLY
Filed June 25, 1957  3 Sheets-Sheet 2
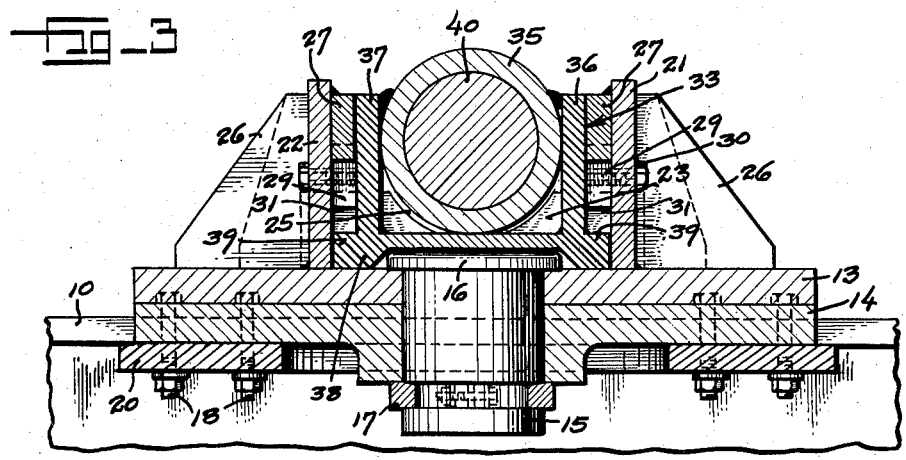
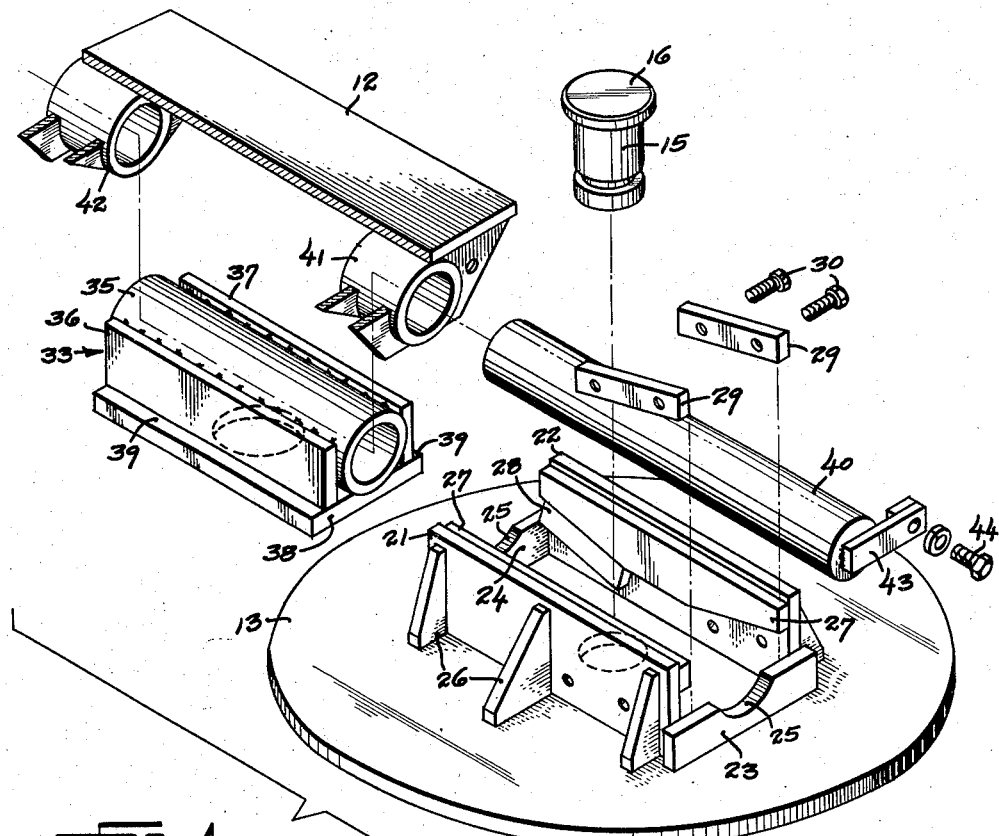
INVENTOR.
Wallace M. Brown
Attorneys

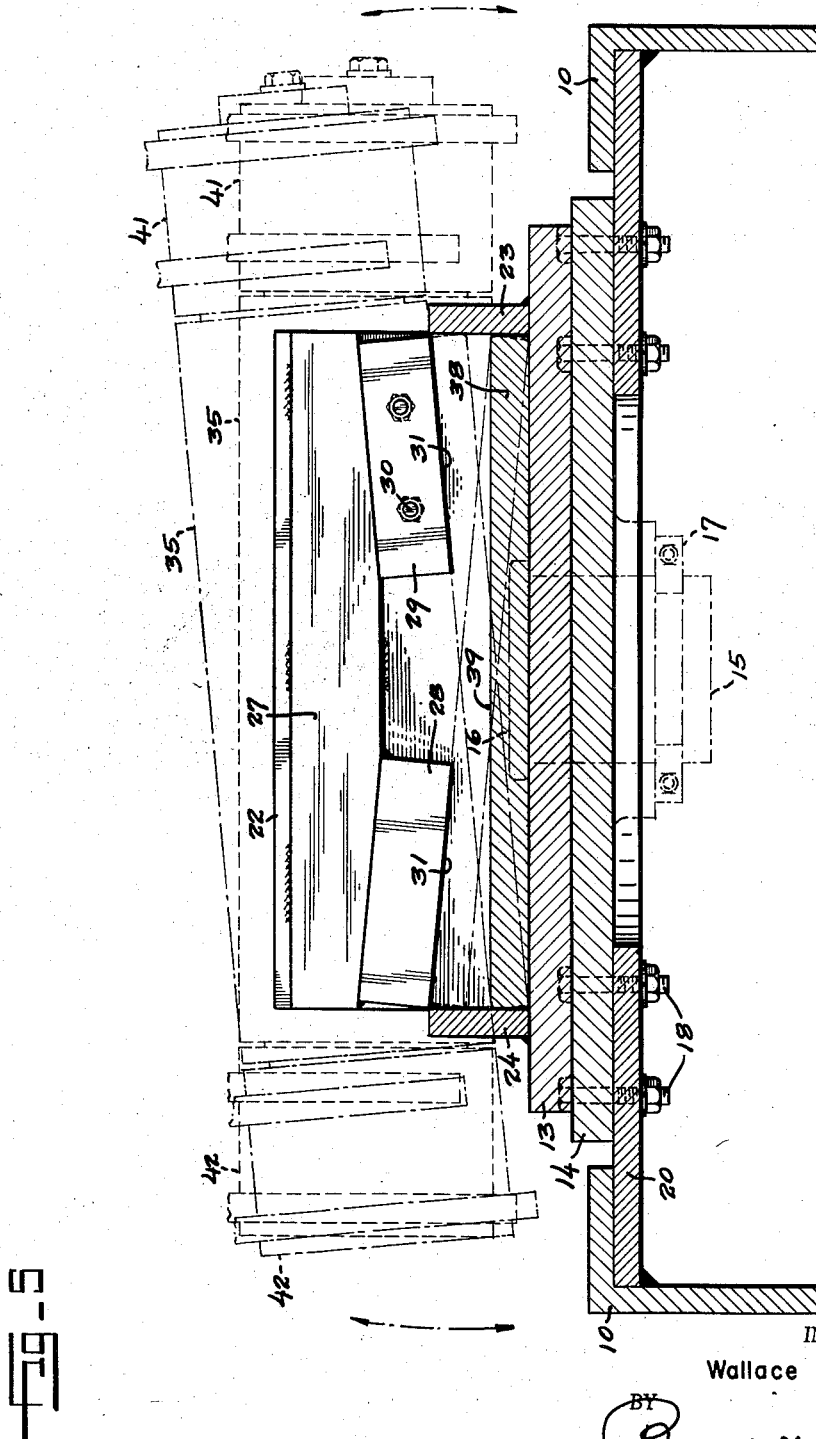

United States Patent Office 2,857,174
Patented Oct. 21, 1958

2,857,174

FIFTH-WHEEL ASSEMBLY

Wallace M. Brown, Seattle, Wash., assignor to Pacific Car and Foundry Company, Seattle, Wash., a corporation of Washington Application June 25, 1957, Serial No. 667,849

8 Claims. (Cl. 280—438)

This invention relates to tractor-and-trailer combinations in which the vehicle being trailed connects with the tractor by structure commonly known as a fifth-wheel. The combination of the present invention finds its greatest usefulness with equipment of the type employed in moving dirt or other sundry work where the terrain over which the equipment is required to travel is of such changing contour, transversely considered, that the axle of the trailed vehicle is frequently canted in a very substantial degree from the horizontal plane in which the rear axle of the tractor lies. Fifth-wheels for earth-moving and rock-hauling rigs commonly employ a king-pin, and provide complementing horizontal thrust or rub-plates rotatively movable relative to one another about the center of the king-pin as an axis, one such plate being made a fixed adjunct of the truck while the other plate is carried by the trailer.

Previous to the development of the present assembly, there have been in general use for the described and analagous purpose two types of fifth-wheel construction. One is usually referred to as a double oscillating fifth-wheel and is characterized in that a cross-pin hung from the front end of the trailer admits to wrist movement about a transverse horizontal axis within a muff or bushing which is in turn journaled for oscillatory motion about a longitudinal horizontal axis, both axes being fixed in vertical planes traversing the rotary axis of the king-pin. In this arrangement the trailer's vertical load can be considered as concentrated upon a single point located on the longitudinal center line, wherefor the coupling lacks the stability which should be provided due to the freedom of movement of the trailer laterally within limits imposed only by the restrictions of the oscillatory angle. Because of the high center of gravity of the load in rigs of the described character, it has been found desirable to derive some stability at the forward end of the trailer through the tractor. The other of the two noted fifth-wheel constructions accomplished this stability by permitting a moderate degree of vertical displacement as between the upper and the lower of the two thrust plates. The permitted separation between upper and lower thrust plates, so that the upper said plate would ride "on-edge," so to speak, when the axle of the trailer became canted relative to the rear axle of the tractor in a degree beyond the capacity of the springs to handle, gave limited compensation for extreme ground irregularity.

The present invention has for its general object the provision of a perfected fifth-wheel assembly especially adapted for tractor-and-trailer rigs of the described character, a fifth-wheel particularly which can be said to spread or distribute the vertical load of the trailer so that the tractor will help the overall stability of the combination rig and require a very sizable force to disturb equilibrium.

The invention has the further and important object of providing a fifth-wheel assembly including a king-pin and thrust plates rotatively mounted relative to one another about the center of the king-pin as an axis, and particularly characterized in that provision is made for maintaining constant contact as between the thrust plates throughout the full compass of the bearing surfaces thereof while permitting, in a compensating box located above the thrust plates, free movement of the frame of the trailer within a comparatively wide arc of lateral rocking motion.

Yet additional objects and advantages will, with the foregoing, appear and be understood in the course of the following description and claims, the invention consisting in the novel construction and in the adaptation and combination of parts hereinafter described and claimed.

In the accompanying drawings:

Figure 1 is a fragmentary view partly in elevation and partly in transverse vertical section illustrating a fifth-wheel assembly constructed to embody preferred teachings of the present invention, the section line traversing the center of the king-pin.

Fig. 2 is a fragmentary horizontal sectional view on line 2—2 of Fig. 1.

Fig. 3 is a fragmentary longitudinal vertical sectional view on line 3—3 of Fig. 2, with the frame of the trailer deleted.

Fig. 4 is an exploded perspective view of the parts composing the fifth-wheel assembly; and Fig. 5 is a fragmentary transverse vertical sectional view drawn to an enlarged scale on line 5—5 of Fig. 2.

In said drawings, the illustration of the tractor and its trailer are limited to a showing, for the former, of the laterally spaced longitudinally extending frame channels designated by the numeral 10 and, for the latter, of the transversely extending bunk 12 which is made a fixed part of the trailer frame at the front end thereof.

The fifth-wheel proper of the present invention is comprised of ring-shaped upper and lower sections, designated by 13 and 14, respectively, connected for relative rotation about a vertical axis by a king-pin 15, such king-pin having a head 16 acting in conjunction with a split retainer ring 17 to hold the two wheel sections against displacement in a direction endwise to the axis of rotation. The lower section is secured, as by bolts 18, to a centrally apertured horizontal mounting plate 20 which is welded or otherwise made secure to the channels 10.

According to the present invention, the upper wheel section 13 is rigidly surmounted by an open-top cage fabricated from side walls 21, 22 and end walls 23, 24, with each of such end walls presenting a relatively deep saddle notch 25 in its upper edge. The side walls are braced exteriorly of the cage by ribs 26. Such side walls rise to a height well above the end walls. At the top along the interior face of each side wall there is provided a jutty 27, and immediately below and shouldering against the two end portions of such jutty are respective lugs 28 and 29. The jutty and one lug 28 are welded or otherwise made integral with the related side wall. The other lug 29 is removably secured, as by cap screws 30. The lugs serve a keeper function, and will be hereinafter so termed, with respect to a rocking shoe 33 which is received in the cage. This rocking shoe presents a bushing 35 received between cheek-plates 36, 37 and has a sole 38 underlying the cheek-plates with its side edges projecting as flanges 39 laterally beyond the latter. The bushing, cheek-plates, and sole are an integral structure. The function of the saddle notches 25 is to accommodate projecting ends of the bushing. Dimensionally considered, and allowing tolerance for vertical rocking of either end about the opposite end as a pivot, the length and width of the sole approximates the length and width of the floor of the cage. The depth of the two flanges is appreciably less than the vertical distance from said floor to the bearing end 31 of the keeper lugs 28 and 29.

Journaled for wrist movements within the bushing and projecting by its ends beyond the latter is a pin 40, and engaging said projecting ends are hanger brackets 41 and 42 depending from the trailer bunk 12 as fixed adjuncts of the latter. As a means of insuring that the pin will turn in the bushing rather than the brackets a bar 43 is welded to an exposed end of the pin and is anchored, as at 44, to the bracket. The pin 40 extends transversely of the trailer bunk.

From the foregoing it will be seen that no need arises for the two rotatively sliding sections 13 and 14 of the fifth-wheel to be displaced vertically, relatively, in response to extreme tilting motion of the trailer relative to the tractor. As such tilting occurs, one or the other end of the rocking shoe simply rises in the cage within limits imposed by the keepers 28 or the keepers 29, as the case may be. It will be seen that the bearing edge 31 of the keeper lugs is sloped from the horizontal in correspondence with the inclination of the upper face of the flanges as the rocking shoe moves to the extreme of its permitted rocking motion. The shoe desirably runs dry within the cage, and this is to say that the wear faces are not greased. This is advantageous in order that small stones and other foreign matter entering the cage will be largely expelled by the normal working of the shoe rather than collecting therein by viscosity of a lubricating substance.

Should it be desired to remove the shoe from the cage it is necessary only to withdraw the cap screws 30 which hold the keeper lugs 29 in place. Removing such lugs permits a greater tilting of the shoe into a position whereat the bottom of the elevated edge clears the top edge of the concerned end wall 23 or 24, as the case may be, and the shoe may then be slipped laterally from the cage. Cap screws 30 perforce are not subject to any shear load during the working of the shoe in that the keeper lugs shoulder against the jutty so as to transfer to the latter all lift forces encountered by the lugs in the rocking movement of the shoe.

While the structure here illustrated and described is now considered to best exemplify the invention it will be understood that departures can be made within the scope of the invention, wherefor I intend that no limitations be implied and that the hereto annexed claims be given the broadest interpretation to which the employed language fairly admits.

What I claim is:

1. In a tractor-and-trailer rig, in combination: a tractor carrying the lower component of a fifth-wheel assembly, an upper component serving as the functioning complement of said lower component, a semi-trailer having a transversely extending horizontal pin suspended rigidly from the front end thereof in a centered position as respects the width of the trailer, a bushing held against endwise motion relative to the pin and receiving the latter for wrist movement therein, and means rigidly surmounting said upper component of the fifth-wheel assembly in a position centered thereon and so operatively interconnected with the bushing as to permit each end of the latter to rock vertically within prescribed limits about the other end as an axis while holding the bushing against relative motion in a direction endwise to its axis.

2. In a tractor-and-trailer rig, in combination: a tractor carrying the lower component of a fifth-wheel assembly, an upper component serving as the functioning complement of said lower component, a semi-trailer having a transversely extending horizontal pin suspended rigidly from the front end thereof in a centered position as respects the width of the trailer, a bushing held against endwise motion relative to the pin and receiving the latter for wrist movement therein, and a cage rigidly surmounting said upper component of the fifth-wheel assembly in a position centered thereon and so containing the bushing that the latter is free to rock vertically within prescribed limits about either end of the bushing as a fulcrum while being restrained against relative motion in a direction endwise to its axis.

3. In a tractor-and-trailer rig, in combination: a tractor carrying the lower component of a fifth-wheel assembly, an upper component serving as the functioning complement of said lower component, a semi-trailer having a transversely extending horizontal pin suspended rigidly from the front end thereof in a centered position as respects the width of the trailer, a bushing held against endwise motion relative to the pin and receiving the latter for wrist movement therein, cheek plates at opposite sides of the bushing and a sole plate underlying the bushing and forming therewith an integrated shoe, and a cage rigidly surmounting said upper component of the first-wheel assembly in a position centered thereon and so containing the shoe that the latter is free to rock vertically within prescribed limits about either end of the sole plate as a fulcrum while being restrained against relative motion in a direction endwise to said sole plate.

4. In a tractor-and-trailer rig, in combination: a tractor carrying the lower component of a fifth-wheel assembly, an upper component serving as the functioning complement of said lower component, a semi-trailer having a transversely extending horizontal pin suspended rigidly from the front end thereof in a centered position as respects the width of the trailer, a bushing held against endwise motion relative to the pin and receiving the latter for wrist movement therein, cheek plates at opposite sides of the bushing and a sole plate underlying the bushing and forming therewith an integrated shoe, and an open top cage rigidly surmounting said upper component of the fifth-wheel assembly in a position centered thereon and formed to a general rectangular shape in plan configuration with side walls rising above end walls, the shoe being contained within said cage and being restrained by the end walls against relative motion in a direction endwise to the axis of the bushing while being guided by the side walls for vertical rocking motion about either end of the sole plate as a fulcrum, interengaging means being provided by the shoe and by the cage prescribing a ceiling limit of rocking motion whereat the lower edge of the elevated end of the sole plate lies below the upper edge of the concerned end wall.

5. Structure according to claim 4 in which said interengaging means comprises for the shoe laterally projecting flanges along each side adjacent the bottom thereof, and for the cage keepers along the interior faces of the side walls adjacent the upper edge thereof, the keepers overhanging the flanges.

6. Structure according to claim 5 in which the keepers are detachably secured to the side walls to permit the shoe to be removed from the cage.

7. In a tractor-and-trailer rig, in combination: a tractor carrying the lower component of a fifth-wheel assembly, an upper component serving as the functioning complement of said lower component, a semi-trailer having a transversely extending horizontal pin carried thereby to occupy a position subjacent to the front end of the trailer in a centered position as respects the width of the trailer, a bushing held against endwise motion relative to the pin and receiving the latter for wrist movement therein, and a cage rigidly surmounting said upper component of the fifth-wheel assembly in a position centered thereon and so containing the bushing that the latter is free to rock vertically within prescribed limits about either end of the bushing as a fulcrum while being restrained against relative motion in a direction endwise to its axis.

8. In a tractor-and-trailer rig, in combination: a tractor carrying the lower component of a fifth-wheel assembly, an upper component serving as the functioning complement of said lower component, a semi-trailer having a transversely extending horizontal pin carried thereby to occupy a position subjacent to the front end of the trailer in a centered position as respects the width of the trailer, a bushing held against endwise motion relative to the pin and receiving the latter for wrist movement therein, and means rigidly surmounting said upper component of the fifth-wheel assembly in a position centered thereon and so operatively interconnected with the bushing as to permit each end of the latter to rock vertically within prescribed limits about the other end as an axis while holding the bushing against relative motion in a direction endwise to its axis.

References Cited in the file of this patent

UNITED STATES PATENTS

| | | |
|---|---|---|
| 1,996,162 | Lubbers | Apr. 2, 1935 |
| 2,681,236 | Apgar | June 15, 1954 |